United States Patent
Oshima

(10) Patent No.: US 12,523,885 B2
(45) Date of Patent: Jan. 13, 2026

(54) DISPLAY DEVICE

(71) Applicant: ALPS ALPINE CO., LTD., Tokyo (JP)

(72) Inventor: Chihiro Oshima, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/016,432

(22) Filed: Jan. 10, 2025

(65) Prior Publication Data
US 2025/0237888 A1    Jul. 24, 2025

(30) Foreign Application Priority Data
Jan. 22, 2024    (JP) .................... 2024-007301

(51) Int. Cl.
*G02B 30/56*    (2020.01)
*G02B 30/60*    (2020.01)

(52) U.S. Cl.
CPC ............ *G02B 30/56* (2020.01); *G02B 30/60* (2020.01)

(58) Field of Classification Search
None
See application file for complete search history.

(56) References Cited

U.S. PATENT DOCUMENTS

| | | | |
|---|---|---|---|
| 5,861,993 A | 1/1999 | Shanks et al. | |
| 11,340,475 B2 | 5/2022 | Yamamoto et al. | |
| 12,242,085 B2 | 3/2025 | Kikuta | |
| 2018/0284470 A1* | 10/2018 | Yamamoto | G02B 5/3083 |
| 2021/0302752 A1 | 9/2021 | Yan et al. | |
| 2023/0148045 A1* | 5/2023 | Shimose | G02B 30/27 353/8 |
| 2023/0280598 A1* | 9/2023 | Smithwick | G02B 30/52 359/478 |
| 2024/0411064 A1* | 12/2024 | Smithwick | G02B 27/144 |

FOREIGN PATENT DOCUMENTS

| | | |
|---|---|---|
| CN | 108181712 | 6/2018 |
| JP | 2015-040943 | 3/2015 |
| JP | 2021-047438 | 3/2021 |
| JP | 7240858 | 3/2023 |

OTHER PUBLICATIONS

Extended European Search Report for 25151425.3 mailed on Jun. 4, 2025.
Office Action dated Jul. 28, 2025 issued to related U.S. Appl. No. 18/986,102.
Extended European Search Report for 25151430.3 mailed on Jun. 30, 2025.

* cited by examiner

*Primary Examiner* — Eileen M Adams
(74) *Attorney, Agent, or Firm* — IPUSA, PLLC

(57) ABSTRACT

A display device capable of displaying an aerial video image by utilizing retroreflection is provided. The display device includes a light source including an emission surface for emitting a video image; an optical member configured to separate incident light into reflected light and transmitted light, the optical member being arranged such that a principal surface of the optical member faces the emission surface of the light source in parallel; and a pair of retroreflective members arranged in a region including at least a space between the light source and the optical member. The pair of retroreflective members are arranged so as to be inclined outward with respect to a normal to the emission surface.

8 Claims, 8 Drawing Sheets

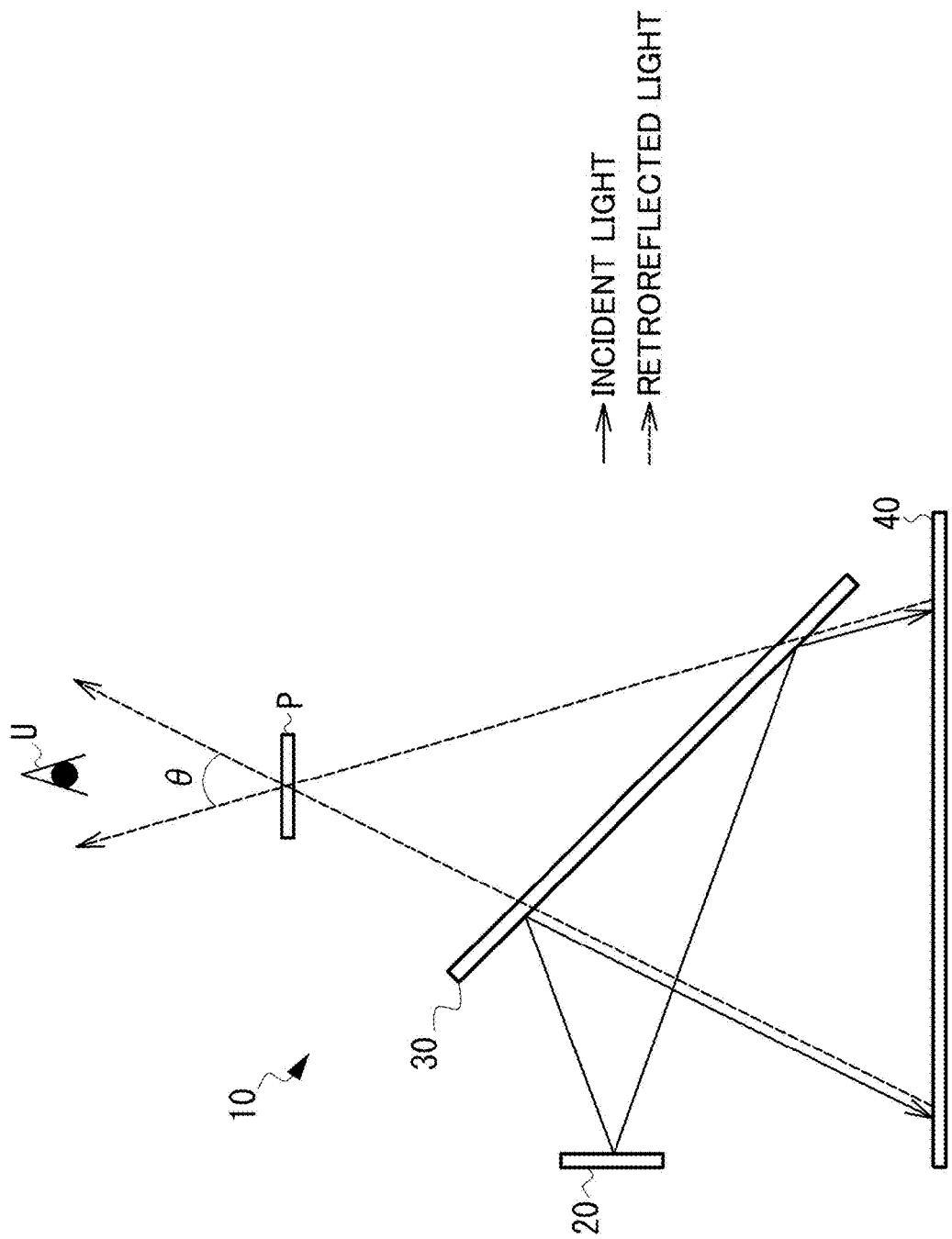

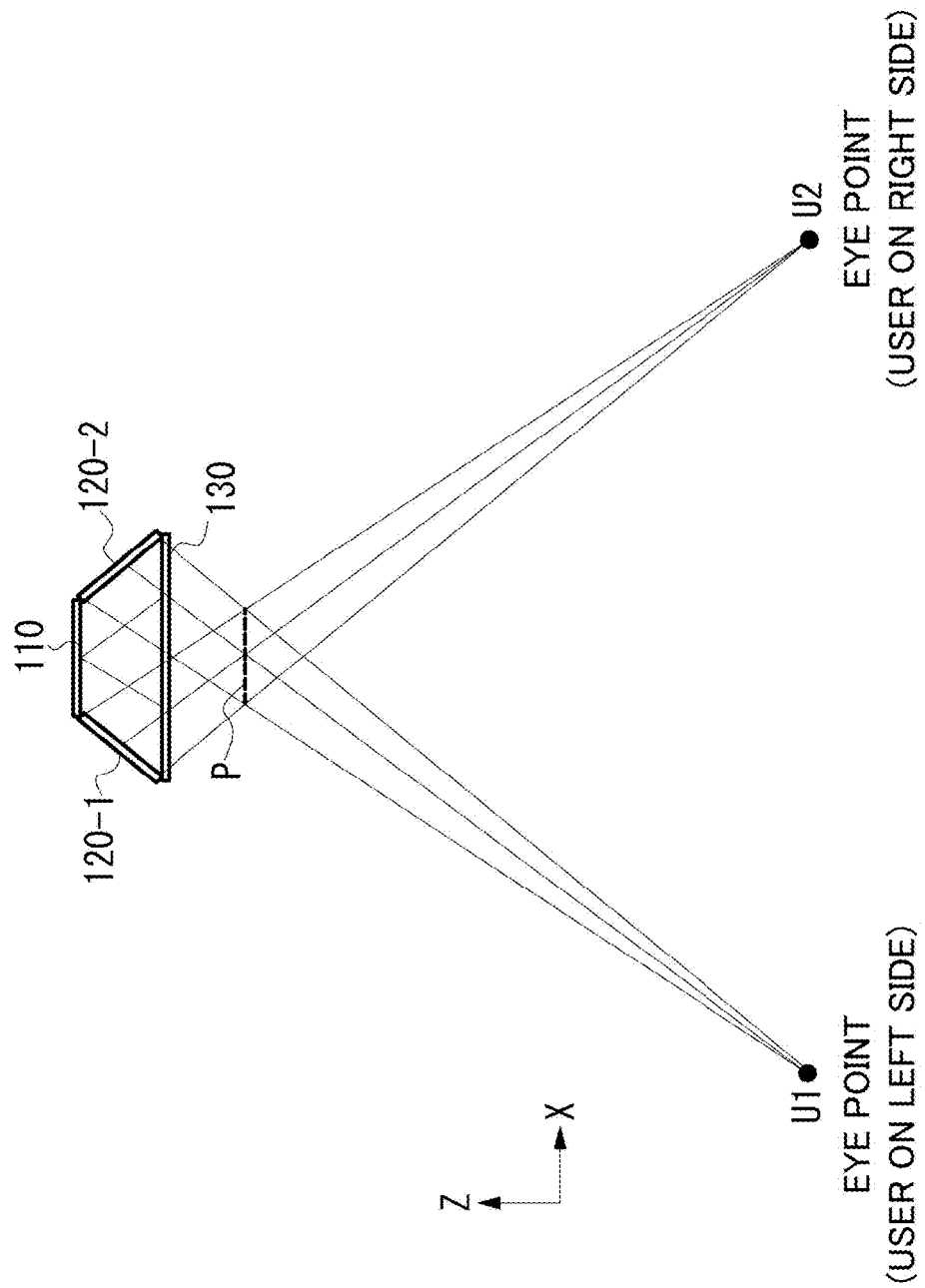

DISPLAY DEVICE

CROSS-REFERENCE TO RELATED APPLICATIONS

The present application is based on and claims priority to Japanese Patent Application No. 2024-007301 filed on Jan. 22, 2024, the entire contents of which are hereby incorporated by reference.

BACKGROUND

1. Field of the Invention

The present disclosure relates to a display device provided with a function of displaying a video image in the air by using retroreflection.

2. Description of the Related Art

Aerial imaging by retro-reflection (AIRR) is known. For example, the display device disclosed in Japanese Laid-Open Patent Application No. 2021-47438 is provided with a first retroreflective section arranged at a position in a direction in which light emitted from a light source is emitted, and an optical splitter which reflects at least a part of the light transmitted through the first retroreflective section as first reflected light and transmits at least a part of the first reflected light retroreflected by the first retroreflective section, enabling observation of an aerial video image from a wide angle.

SUMMARY

A display device according to the present disclosure is capable of displaying an aerial video image by utilizing retroreflection. The display device includes: a light source including an emission surface for emitting a video image, an optical member configured to separate incident light into reflected light and transmitted light, the optical member being arranged such that a principal surface of the optical member faces the emission surface of the light source in parallel, and a pair of retroreflective members arranged in a region including at least a space between the light source and the optical member, wherein the pair of retroreflective members are arranged so as to be inclined outward with respect to the normal to the emission surface.

In one embodiment, the optical member has a rectangular shape larger than the emission surface, the pair of retroreflective members each has a rectangular shape, one retroreflective member is arranged between one end of the emission surface and one end of the optical member, and the other retroreflective member is arranged between the other end of the emission surface and the other end of the optical member. In one embodiment, the pair of retroreflective members each includes a curved retroreflective surface. In one embodiment, each of the pair of retroreflective members is inclined at an angle in accordance with a viewpoint position of a user. In one embodiment, the ends of the pair of retroreflective members are bent by 90 degrees in accordance with the size of the optical member. In one embodiment, the optical member is a half mirror, a beam splitter, or a polarized-beam splitter. In one embodiment, the display device is disposed in an interior space of a vehicle between a driver's seat and a passenger's seat.

BRIEF DESCRIPTION OF THE DRAWINGS

FIG. 1 is a schematic diagram illustrating a schematic configuration of an existing display device;

FIG. 3A is a top view illustrating optical paths of an aerial video image in the display device of the present embodiment;

DETAILED DESCRIPTION OF THE DISCLOSURE

In AIRR display devices, a wide viewing angle is required because a user often views an aerial video image not only from the front but also from the side. FIG. 1 is a diagram illustrating an optical system of a display device with a wide viewing angle. In the figure, solid lines indicate incident light and dashed lines indicate retroreflected light.

As illustrated in FIG. 1, a display device 10 includes a display light source 20, a beam splitter 30, and a retroreflective member 40, and the beam splitter 30 is arranged so as to be inclined toward the display light source 20. A part of light emitted from the display light source 20 is reflected by the beam splitter 30, and the reflected light is retroreflected by the retroreflective member 40 in the same direction as incident light. The retroreflected light passes through the beam splitter 30, and an aerial video image P is displayed above the beam splitter 30. The aerial video image P is formed in a position symmetrical to the display light source 20 with respect to the beam splitter 30.

A viewing angle θ in which a user U can observe the aerial video image P is limited to a range in which the retroreflective member 40 can be seen from a viewpoint through the beam splitter 30. Existing display devices have an issue that the size of the optical system must be increased when the viewing angle θ of the aerial video image P is increased, and this issue is more conspicuous when a display such as an LCD is used as a light source.

An object of the present disclosure is to provide a small-sized display device capable of displaying an aerial video image having a wide viewing angle by solving such existing issue.

The display device according to the present disclosure displays an aerial video image or an aerial image by using retroreflection in a three-dimensional space that can be viewed without wearing special glasses or the like. It should be noted that drawings referred to in the following description of the embodiment include exaggerated representations to facilitate understanding of the disclosure and do not represent the actual shape or scale of the product.

Figure 2A:
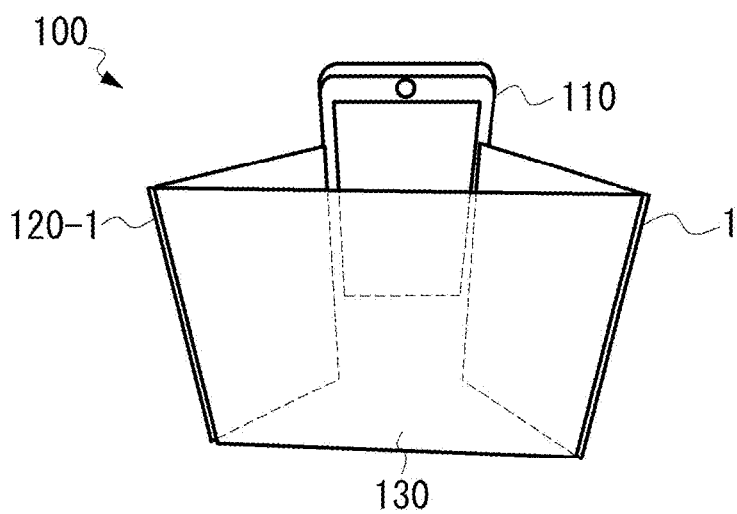
FIG. 2A is a front view illustrating a configuration of a display device according to an embodiment of the present disclosure.
Figure 2B:
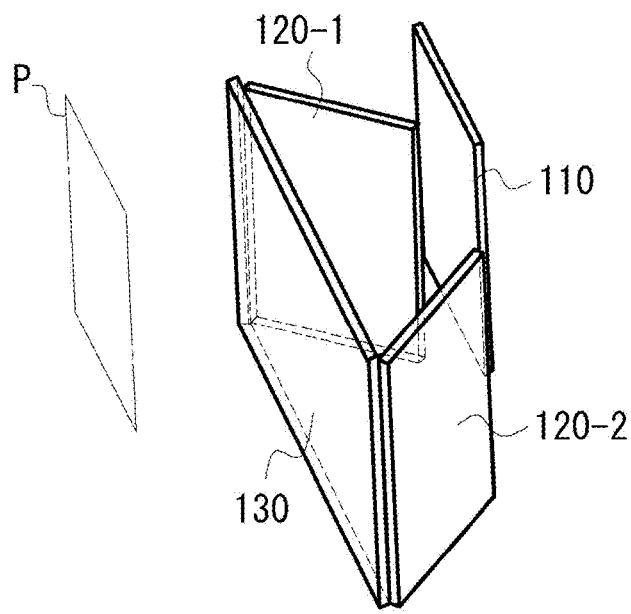
FIG. 2B is a perspective view illustrating the configuration of the display device according to the embodiment.
Figure 2C:
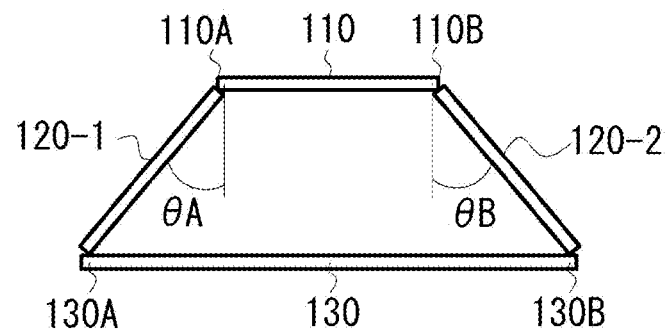
FIG. 2C is a top view illustrating the configuration of the display device according to the embodiment.

Next, an embodiment of the present disclosure will be described in detail. FIGS. 2A to 2C are views illustrating a configuration of a display device according to an embodiment of the present disclosure. FIG. 2A is a front view, FIG. 2B is a perspective view, and FIG. 2C is a top view of the configuration.

A display device 100 of the present embodiment includes a light source 110, a pair of retroreflective members 120-1 and 120-2, and a beam splitter 130. Although not illustrated in figures, these members can be attached to, for example, a casing or a housing.

The light source 110 is, for example, a display light source such as a liquid crystal display device, an organic EL display device, or a projection-type display device, but is not particularly limited thereto as long as it has a function of emitting a video image or an image. The display light source includes, for example, a rectangular emission surface, and emits a video image toward a direction (optical-axis direction) that is normal to the emission surface. The display light source may be, although not particularly limited, a smartphone screen as illustrated in FIG. 2A, or may be a screen of a mobile terminal, a screen of a personal computer, a screen of a projector, or the like.

The beam splitter 130 is an optical member that separates incident light into transmitted light and reflected light. For example, a half mirror or a polarized-beam splitter is used when polarized light is used. The beam splitter 130 exemplified herein is formed of a rectangular sheet or a thin plate that is larger than the emission surface of the light source 110. In other words, the lengths of the beam splitter 130 in a longitudinal direction and a short direction are larger than the lengths of the emission surface in the longitudinal direction and the short direction, and a principal surface of the beam splitter 130 is arranged so as to face the emission surface of the light source 110 horizontally. A distance between the beam splitter 130 and the emission surface is appropriately determined in accordance with sizes and inclination angles of the retroreflective members 120-1 and 120-2 arranged in the region including at least the space between them.

The pair of retroreflective members 120-1 and 120-2 are optical members that reflect light in the same direction as the incident light, and are formed of, for example, prismatic retroreflective elements such as triangular pyramidal retroreflective elements, full-cube corner retroreflective elements, and bead retroreflective elements. The pair of retroreflective members 120-1 and 120-2 exemplified herein are formed of rectangular sheets or thin plates of the same size, and are arranged in an area including at least the space between the light source 110 and the beam splitter 130. That is, far-side ends of the retroreflective members 120-1 and 120-2 may project further away from the light source 110 from a viewpoint of a user, and inner ends of the retroreflective members 120-1 and 120-2 may project further toward the user from the beam splitter 130 from the viewpoint of the user.

More specifically, as illustrated in FIG. 2C, one of the retroreflective members 120-1 is arranged so as to be aligned with one end 110A of the emission surface of the light source 110 and with one end 130A of the beam splitter 130, and inclined at an angle θA with respect to the normal (optical axis) to the emission surface. The other retroreflective member 120-2 is arranged so as to be aligned with the other end 110B of the emission surface of the light source 110 and with another end 130B of the beam splitter 130, and inclined at an angle θB with respect to the normal (optical axis) to the emission surface. As will be described in the following, the angles θA and θB are determined according to viewpoint positions of users. When the viewpoint positions of the left and right users are symmetrical with respect to the display device 100, the angles θA and θB are in a relationship θA=θB, and the pair of retroreflective members 120-1 and 120-2 may be arranged symmetrically with respect to the optical axis. In this case, an aspect ratio of the beam splitter 130 may be the same as that of the emission surface, or the aspect ratio may be different.

Figure 3B:
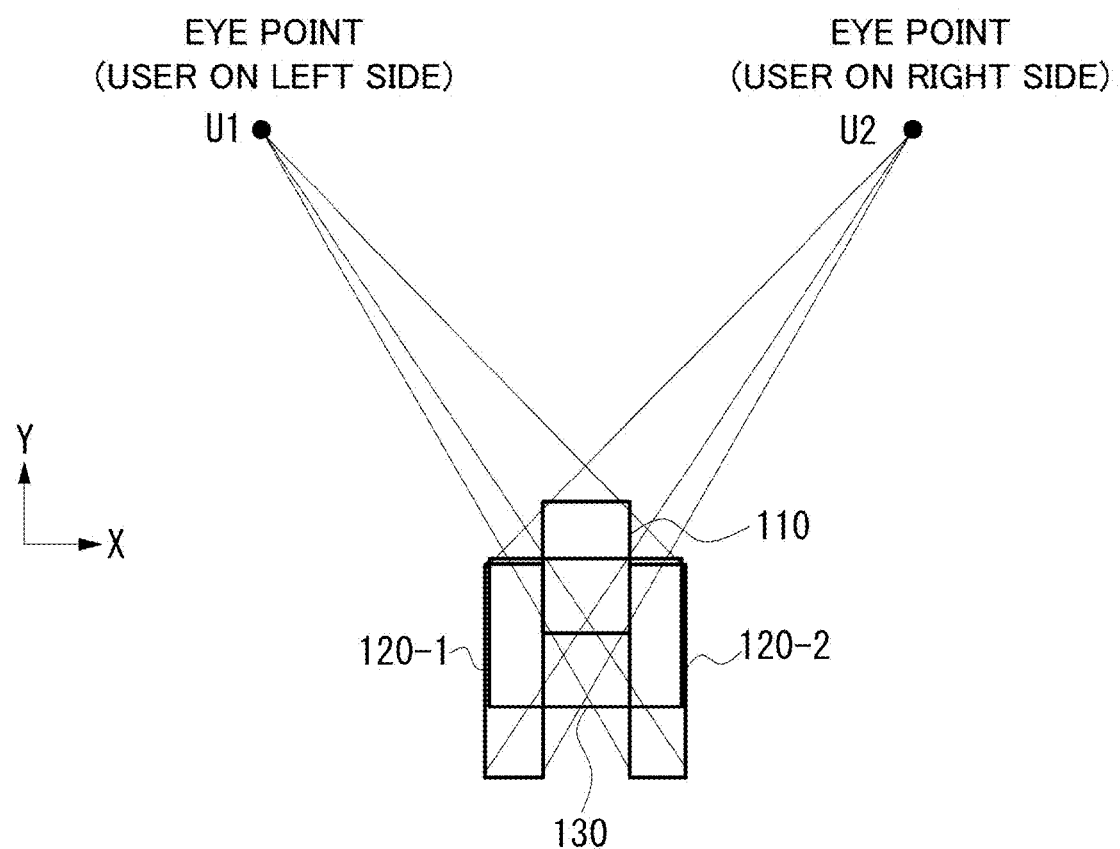
FIG. 3B is a front view illustrating the optical paths of the aerial video image in the display device of the present embodiment.
Figure 3C:
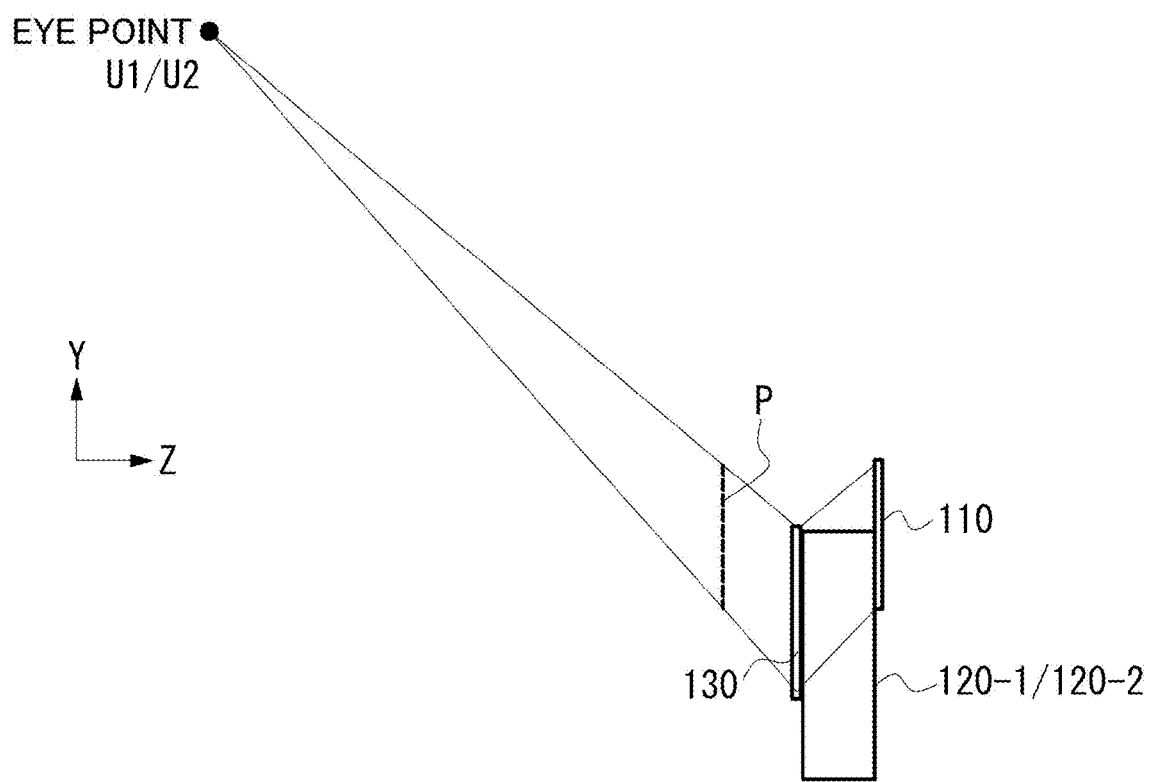
FIG. 3C is a side view illustrating the optical paths of the aerial video image in the display device of the present embodiment.

Next, operation of the display device of the present embodiment will be described. FIGS. 3A to 3C are optical-path diagrams when an aerial video image is displayed. FIG. 3A is a top view, FIG. 3B is a front view, and FIG. 3C is a side view of the optical-path diagram when an aerial video image is displayed. It is assumed that the retroreflective members 120-1 and 120-2 are inclined outward at the angles where θA=θB.

Light (image) emitted from the emission surface of the light source 110 in the direction (optical-axis direction) that is normal to the emission surface is incident on the beam splitter 130, where a part of the incident light is reflected, and the reflected light is retroreflected by the retroreflective members 120-1 and 120-2 in the same direction as the incident light, the retroreflected light is transmitted through the beam splitter 130, and the transmitted light forms an image to generate the aerial video image P. The aerial video image P is generated at positions symmetrical to the beam splitter 130 with respect to the light source 110.

As illustrated in FIG. 3A, the retroreflective member 120-2 is arranged at the inclination angle θB, and a user U1 on the left side, that is in a retroreflecting direction, can observe the retroreflective member 120-2 from a viewpoint of the user U1 through the beam splitter 130, and thus can visually recognize the aerial video image P in a viewing direction. Similarly, a user U2 on the right side, that is in the retroreflecting direction, where the retroreflective member 120-1 is arranged at the inclination angle θA, can observe the retroreflective member 120-1 from a viewpoint of the user U2 through the beam splitter 130, and thus can visually recognize the aerial video image P in a viewing direction. Furthermore, since the retroreflective members 120-1 and 120-2 cannot or are difficult to be observed via the beam splitter 130 from a front position, that is the center between the viewpoint of the user U1 on the left side and the viewpoint of the user U2 on the right side, the aerial video image P cannot or is difficult to be visually recognized by the users U1 and U2.

As described above, according to the present embodiment, the beam splitter 130 is arranged in parallel with the light source 110, and the pair of retroreflective members 120-1 and 120-2 inclined outward are arranged at least in a region including the space between the light source 110 and the beam splitter 130, thereby widening the viewing angle of the aerial video image while achieving a thin optical system.

As an aspect of the present embodiment, when the light emitted from the light source 110 is polarized light (for example, a video image of a liquid crystal display device), a retardation film such as a λ/4 film may be provided on surfaces of the retroreflective members 120-1 and 120-2, and a polarized-beam splitter may be used for the beam splitter 130. The polarized-beam splitter transmits a part of the light of a certain polarization state and reflects the rest. A polarizing direction of the polarized-beam splitter is determined in relation to the polarizing direction of the light emitted from the light source 110, and for example, the polarizing direction of the light source 110 is set to be substantially orthogonal to the polarizing direction of the polarized-beam splitter.

In the above-described embodiment, a pair of retroreflective members 120-1 and 120-2 are disposed on the left and right sides, respectively, of the light source 110 in order to widen the viewing angle in a horizontal direction of the aerial video image, but in order to widen the viewing angle in a vertical direction of the aerial video image, the pair of retroreflective members may be disposed on upper and lower sides, respectively, of the light source.

Figure 4:
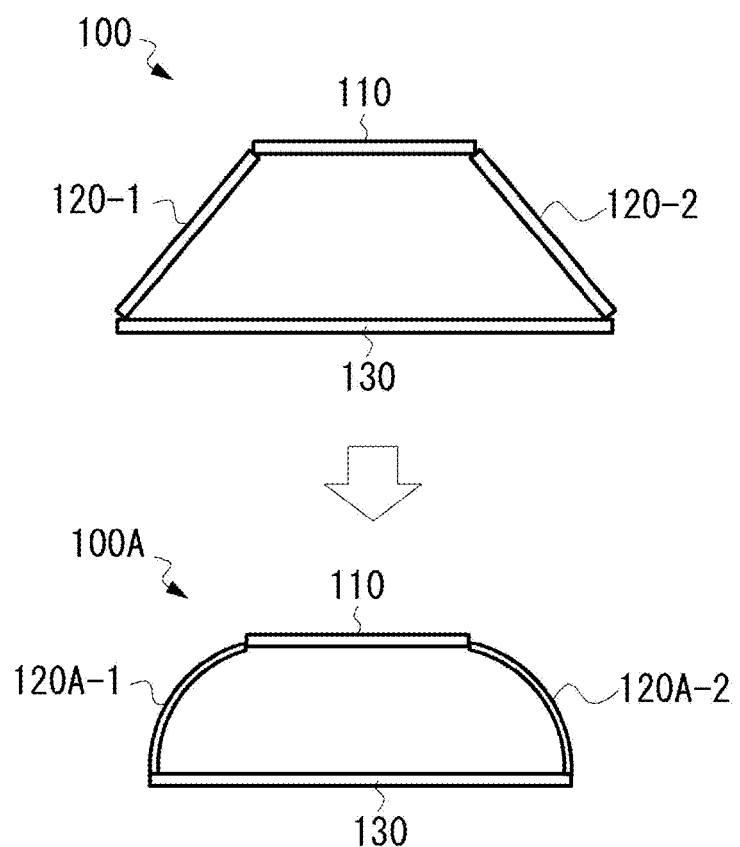
FIG. 4 is a diagram illustrating a modified example of the display device of the present embodiment.

Next, a modified example of the display device of the present embodiment will be described. FIG. 4 is a top view of a display device 100A of the modified example. In the embodiment described above, the retroreflective surfaces of the retroreflective members 120-1 and 120-2 are flat, but in the display device 100A of the modified example, surfaces of retroreflective members 120A-1 and 120A-2 are curved or spherical and each surface forms a fan shape. The curvature or the center of curvature of the retroreflective members 120A-1 and 120A-2 are appropriately determined in accordance with the positions of the viewpoints of the users U1 and U2 on the left and right sides. By using such a curved retroreflective member, the viewing angle can be made wider than when a flat retroreflective member is used.

Figure 5A:
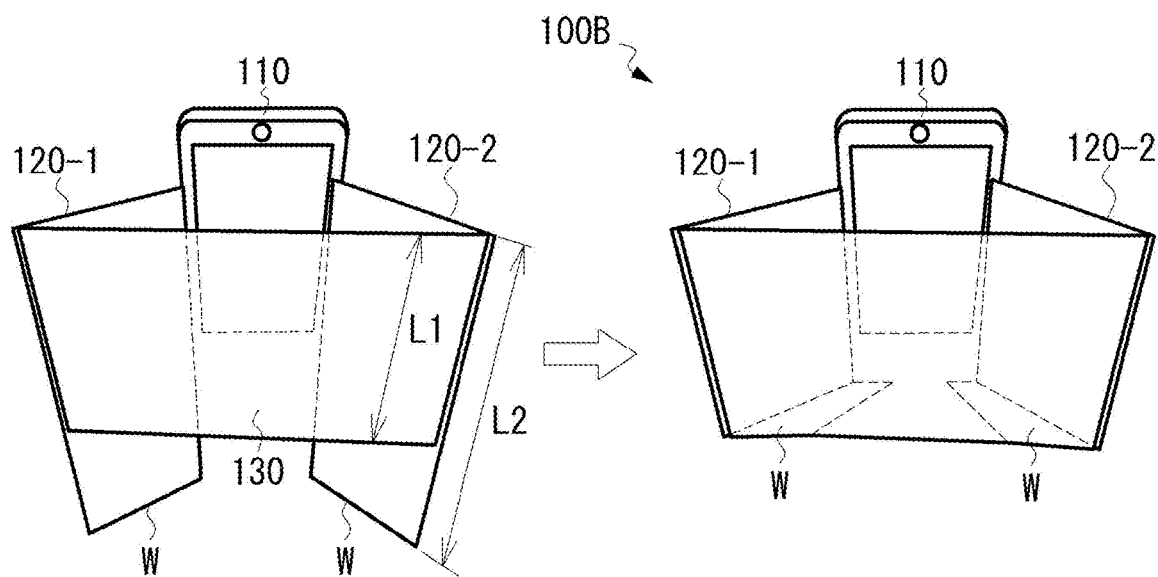
FIG. 5A is front views of a display device of another modified example of the present embodiment.
Figure 5B:
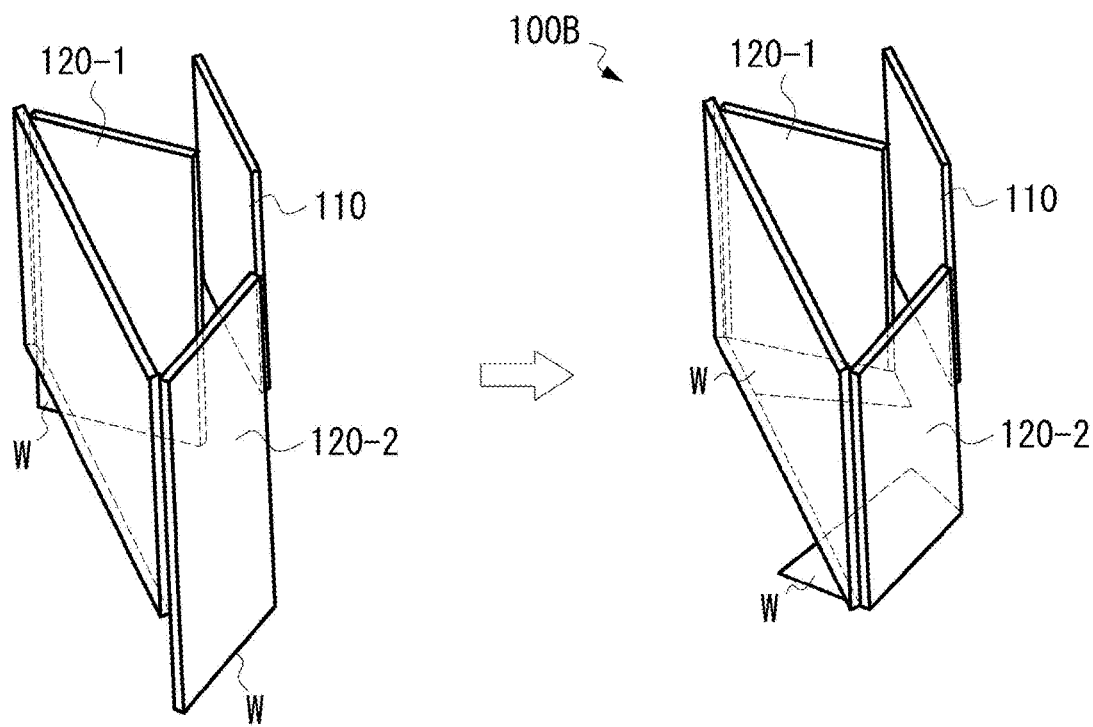
FIG. 5B is perspective views of the display device of the modified example of the present embodiment.

FIG. 5A is front views of a display device 100B of another modified example, and FIG. 5B is perspective views of the display device 100B of the modified example. As illustrated in FIG. 5A, it is possible to make a length L2 of the pair of retroreflective members 120-1 and 120-2 longer than a length L1 of the beam splitter 130, and to use a projecting lower end W when viewing an aerial video image from a certain viewpoint. On the other hand, in order to miniaturize the optical system, it may be desired to make the length L1 of the beam splitter 130 approximately equal to the length L2 of the pair of retroreflective members 120-1 and 120-2. However, when using existing mass-produced components, it may not be easy to make the length L1 of the beam splitter 130 equal to the length L2 of the retroreflective members 120-1 and 120-2 (L2>L1).

In such a case, upper ends of the retroreflective members 120-1 and 120-2 are aligned with an upper end of the beam splitter 130, and extended lower ends W of the retroreflective members 120-1 and 120-2 are bent in a direction of 90 degrees at positions matching with the length L1 of the beam splitter 130. The bent lower ends W do not directly affect the display of the aerial video image. Additionally, the lower ends of the retroreflective members 120-1 and 120-2 may be aligned with a lower end of the beam splitter 130, and the upper ends of the retroreflective members 120-1 and 120-2 may be bent. By bending the retroreflective members as described above, the optical system of the display device 100B can be miniaturized and the manufacturing cost can be reduced.

Figure 6A:
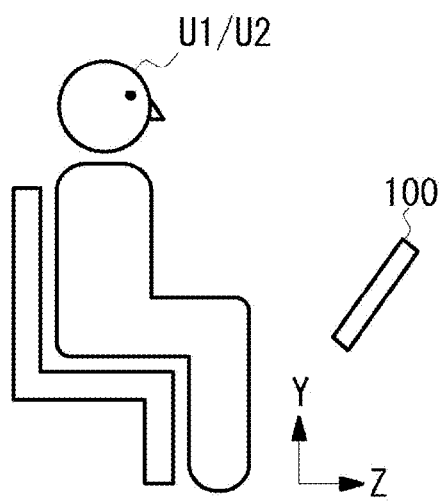
FIGS. 6A to 6C are diagrams illustrating application examples of the display device according to the embodiment of the present disclosure.
Figure 6B:
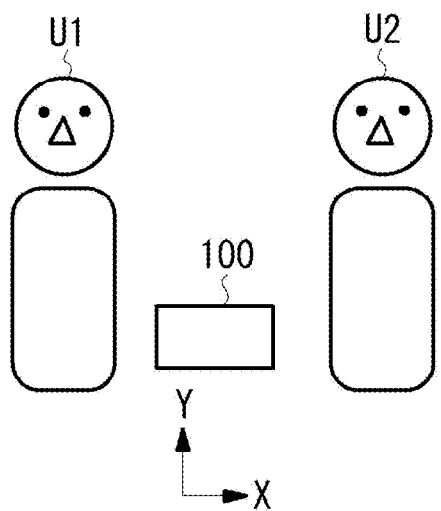

Next, application examples of the display device of the present embodiment will be described. FIG. 6A is a side view illustrating a positional relationship between users and the display device 100, and FIG. 6B is a front view illustrating the positional relationship between the users and the display device 100. It should be noted that such a positional relationship is merely an example, and the display device of the present disclosure is not limited to such a positional relationship.

For example, the display device 100 is located at a center position between the user U1 and the user U2, and is disposed so as to incline upward such that the display device 100 faces the viewpoint direction of the users, and the internal right and left retroreflective members are disposed so as to incline outward such that the retroreflective members face the viewpoint directions of the users U1 and U2. The left and right users U1 and U2 can visually recognize the corresponding aerial video image in their respective viewing directions.

Figure 6C:
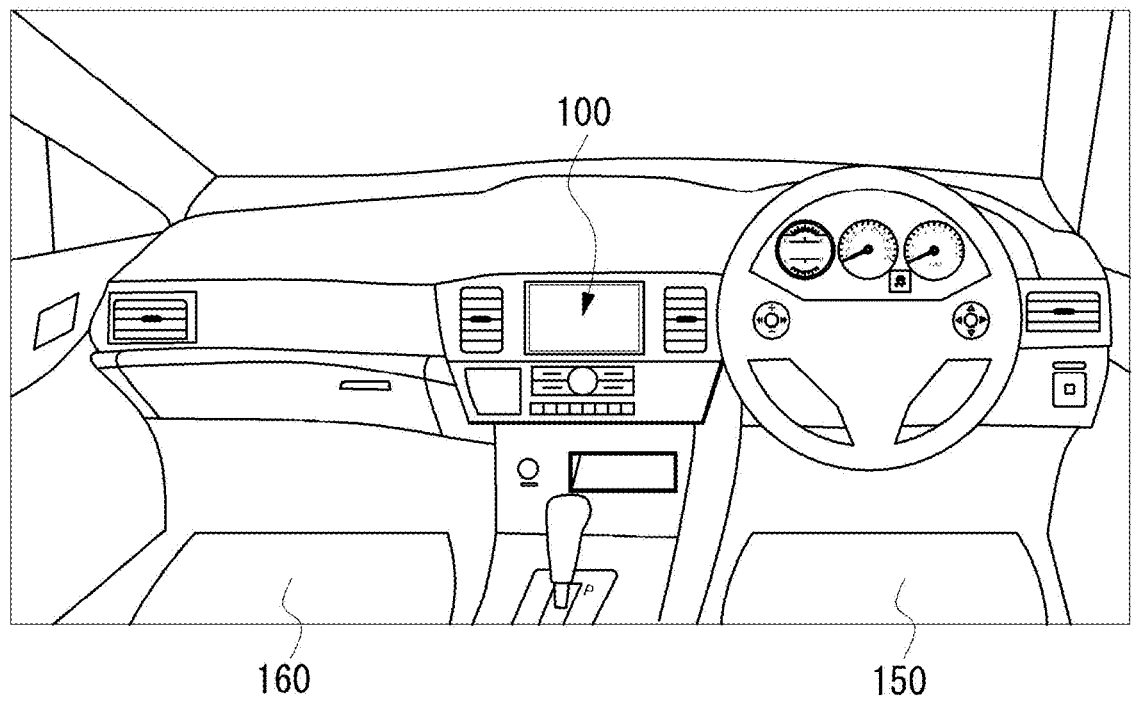

FIG. 6C illustrates an example in which the display device 100 is installed in an interior space (for example, to a dashboard or instrument panel portion) of a vehicle between a driver's seat 150 and a passenger's seat 160. A driver seated in the driver's seat 150 and the passenger seated in the passenger's seat 160 can visually recognize corresponding aerial video image displayed by the display device 100 from their respective viewing directions. Also, passengers seated in the seats behind the driver's seat 150 and the passenger's seat 160 can visually recognize the corresponding aerial video image from their respective viewing directions. Furthermore, when the viewing direction of the passenger seated in the rear seat is generally the direction in which the display device 100 is viewed from the front, the passenger seated in the rear seat can visually recognize a video image emitted from the light source through a beam splitter instead of visually recognizing the aerial video image. In this case, the beam splitter is, for example, a half mirror.

Furthermore, in addition to the interior space of a vehicle, the display device of the present embodiment can be applied to devices and systems that require viewing of aerial video images or aerial images from left and right sides. For example, the display device can be applied to the front of seats of a 2-seater attraction, or to the front of seats of a train, a bus, or an aircraft.

According to the present disclosure, by providing a pair of inclined retroreflective members in a region including at least a space between the light source and the optical member, it is possible to widen a viewing angle of an aerial video image while reducing the thickness direction of the optical system.

Although the preferred embodiment of the present invention has been described in detail above, the present invention is not limited to a specific embodiment, and various modifications and changes can be made within the scope of the gist of the invention described in the claims.

What is claimed is:

1. A display device capable of displaying an aerial video image by utilizing retroreflection, the display device comprising:
    a light source including an emission surface for emitting a video image;
    an optical member configured to separate incident light into reflected light and transmitted light, the optical member being arranged such that a principal surface of the optical member faces the emission surface of the light source in parallel; and
    a pair of retroreflective members arranged in a region including at least a space between the light source and the optical member, wherein
    the pair of retroreflective members are arranged so as to be inclined outward with respect to a line normal to the emission surface,
    the optical member has a rectangular shape larger than the emission surface, and each of the pair of retroreflective members has a rectangular shape, and
    one of the pair of retroreflective members is arranged between one end of the emission surface and one end of the optical member, and another of the pair of retroreflective members is arranged between another end of the emission surface and another end of the optical member.

2. The display device according to claim 1, wherein each of the pair of retroreflective members includes a curved retroreflective surface.

3. The display device according to claim 1, wherein each of the pair of retroreflective members is inclined at an angle in accordance with a user's viewpoint position.

4. The display device according to claim 1, wherein an end of each of the pair of retroreflective members is bent by 90 degrees in accordance with a size of the optical member.

5. The display device according to claim 1, wherein the optical member is a half mirror, a beam splitter, or a polarized-beam splitter.

6. The display device according to claim 1, wherein the display device is disposed in an interior space of a vehicle between a driver's seat and a passenger's seat.

7. A display device capable of displaying an aerial video image by utilizing retroreflection, the display device comprising:
a light source including an emission surface for emitting a video image;
a half mirror configured to separate incident light into reflected light and transmitted light, the half mirror being arranged such that a principal surface of the half mirror faces the emission surface of the light source in parallel; and
a pair of retroreflective members arranged in a region including at least a space between the light source and the half mirror, wherein
the pair of retroreflective members are arranged so as to be inclined outward with respect to a line normal to the emission surface,
the half mirror has a rectangular shape larger than the emission surface, and each of the pair of retroreflective members has a rectangular shape, and
one of the pair of retroreflective members is arranged between one end of the emission surface and one end of the half mirror, and another of the pair of retroreflective members is arranged between another end of the emission surface and another end of the half mirror.

8. A display device capable of displaying an aerial video image by utilizing retroreflection, the display device comprising:
a light source including an emission surface for emitting a video image;
a beam splitter configured to separate incident light into reflected light and transmitted light, the beam splitter being arranged such that a principal surface of the beam splitter faces the emission surface of the light source in parallel; and
a pair of retroreflective members arranged in a region including at least a space between the light source and the beam splitter, wherein
the pair of retroreflective members are arranged so as to be inclined outward with respect to a line normal to the emission surface,
the beam splitter has a rectangular shape larger than the emission surface, and each of the pair of retroreflective members has a rectangular shape, and
one of the pair of retroreflective members is arranged between one end of the emission surface and one end of the beam splitter, and another of the pair of retroreflective members is arranged between another end of the emission surface and another end of the beam splitter.

* * * * *